United States Patent

(12) United States Patent
Parla et al.

(10) Patent No.: US 9,077,730 B2
(45) Date of Patent: Jul. 7, 2015

(54) RESTRICTING NETWORK ACCESS WHILE CONNECTED TO AN UNTRUSTED NETWORK

(75) Inventors: Vincent E. Parla, North Hampton, NH (US); Philip John Steuart Gladstone, Carlisle, MA (US); Christopher Fitzgerald, Boulder, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 182 days.

(21) Appl. No.: 13/019,702

(22) Filed: Feb. 2, 2011

(65) Prior Publication Data

US 2012/0198519 A1 Aug. 2, 2012

(51) Int. Cl.
*H04L 29/06* (2006.01)
*H04L 9/32* (2006.01)

(52) U.S. Cl.
CPC ........... *H04L 63/107* (2013.01); *H04L 63/0272* (2013.01)

(58) Field of Classification Search
None
See application file for complete search history.

(56) References Cited

U.S. PATENT DOCUMENTS

| 6,609,154 | B1 * | 8/2003 | Fuh et al. ............ 709/225 |
| 7,568,220 | B2 * | 7/2009 | Burshan ............... 726/4 |
| 7,991,854 | B2 * | 8/2011 | Bahl ................... 709/220 |
| 2007/0033646 | A1 * | 2/2007 | Tosey et al. .......... 726/15 |
| 2008/0046558 | A1 * | 2/2008 | Raja et al. ........... 709/224 |
| 2008/0114857 | A1 * | 5/2008 | Snider ................ 709/217 |
| 2009/0241167 | A1 * | 9/2009 | Moore ................ 726/1 |
| 2010/0199332 | A1 * | 8/2010 | Bachmann et al. ...... 726/4 |

OTHER PUBLICATIONS

Cyberoam's Identity-Based UTM Solutions Now Include 'Always on' VPN Connectivity(Enterprise Networks & Servers Jun. 2007 Issue, Product News).
Juniper Networks VPN Tunnel Types Overview (Published Aug. 20, 2009).

* cited by examiner

*Primary Examiner* — Jung Kim
*Assistant Examiner* — Janusz Kusyk
(74) *Attorney, Agent, or Firm* — Patterson & Sheridan LLP

(57) ABSTRACT

In an example embodiment, disclosed herein is an apparatus comprising an interface configured to communicate with at least one external device, and processing logic coupled with the interface. The processing logic determines whether the interface is connected directly to a predefined network. The processing logic restricts access to the interface responsive to determining the interface is connected to a network other than the predefined network. The processing logic does not restrict access to the interface while the interface is directly connected with the predefined network.

21 Claims, 4 Drawing Sheets

RESTRICTING NETWORK ACCESS WHILE CONNECTED TO AN UNTRUSTED NETWORK

TECHNICAL FIELD

The present disclosure relates generally to securing network communications.

BACKGROUND

A mobile user may not be protected while disconnected from their Enterprise network (or Trusted Network). For example, when a user takes their laptop or mobile phone with them, they are able to connect to the internet and connect with any site, including sites that would be blocked by the Enterprise network. When outside the Enterprise (or Trusted) network, malware that is present on the endpoint can establish a connection that would normally be captured/blocked by devices on the enterprise network. Malware on a local network at a remote location can send packets to an endpoint and potentially gain access to the endpoint (for example by using a MSRPC (Microsoft Remote Procedure Call) from an untrusted device on the remote network).

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
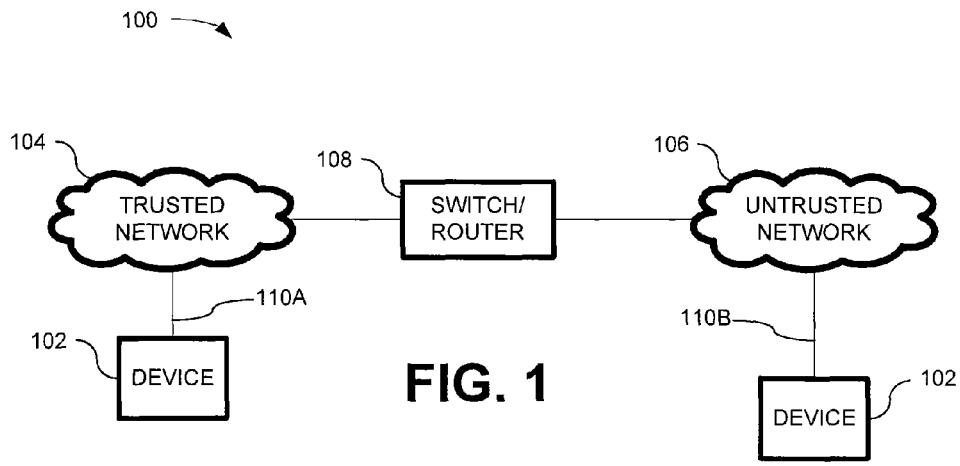
FIG. 1 illustrates an example of where a device may connect to a trusted network or an untrusted network in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an interface configured to communicate with at least one external device, and processing logic coupled with the interface. The processing logic determines whether the interface is connected directly to a predefined network. The processing logic restricts access to the interface responsive to determining the interface is connected to a network other than the predefined network. The processing logic does not restrict access to the interface while the interface is directly connected with the predefined network.

In accordance with an example embodiment, there is disclosed herein, method comprising determining whether an interface is connected to a predefined network. access to the interface is selectively restricted by a processor while the interface is connected to a network other than the predefined network. The restrictions to the interface are removed by the processor while the interface is connected to the predefined network.

In accordance with an example embodiment, there is disclosed herein, logic encoded on at least one non-transitory tangible media for execution by a processor, and when executed operable to determine whether an interface is connected to a predefined network. The logic is further operable to selectively restrict access to the interface by a processor while the interface is connected to a network other than the predefined network. The logic permits unrestricted access to the interface by a processor while the interface is connected to the predefined network.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein, is a device that is configured to restrict network connectivity while the device is outside of a 'trusted' Enterprise Network (or trusted zone). For example, the device may be configured to restrict network connectivity until a VPN (Virtual Private Network) connection is established. The device may be configured to only allow traffic that establishes the VPN connection while the device is outside of the trusted zone until the VPN connection is established.

There are numerous ways for the device to determine whether the device is outside the trusted zone. For example, the device may check DHCP (Dynamic Host Configuration Protocol) parameters (such as Domain Name System "DNS" servers, default DNS search), send probes to a server with a known name and cryptographically validating the correct server was contacted (such as for example using HTTPS "Hypertext Transfer Protocol Secure"), and/or trying to connect to a known point on the Internet (or trusted zone) and have the filtering devices cryptographically prove that they are in the path. As another example, a router may employ an agreed upon protocol (such as a router protocol) to indicate to the device in a cryptographic manner that the device is on a trusted network. While outside the trusted zone, all non-VPN tunnel network traffic in or out of the device is blocked until the VPN connection is fully authenticated and established, at which point all traffic will flow back to the enterprise (or trusted zone) from the endpoint device. No traffic will be accepted or allowed to leave the device on a non-VPN interface. While the device is not connected to the VPN, all traffic is blocked and/or filtered to prevent data egress (data loss prevention or "DLP"), and ingress to the device (malware protection).

At some locations, it may not be possible to reach the VPN device due to captive portal mechanisms (for example a coffee shop may require to accept a custom web form before granting internet access). An example embodiment described herein provides a detection mechanism that sends a probe to the remote VPN termination device and detecting whether the response is an expected response. Depending on VPN policy, the device may block all network access if the captive portal is not remediated in a specified amount of time. This block can be removed to make subsequent remediation attempts if needed The remediation process can be conducted in a limited manner, for example by opening local network access only for protocols needed to establish the VPN connection (such as HTTPS/HTTP and/or DNS). Additional filter inspection can be applied to the open protocols to ensure they do not harm the endpoint (for example by stripping javascript content). While the remediation 'window' is open, the device continues to attempt to reach the VPN termination device, and once the device reaches the VPN termination device, the connection is clamped down to only permit access to the remote VPN termination device until the VPN session is fully established. In an example embodiment, zone detection may be performed before the portal is captured (e.g. before the VPN connection is established) and again after the VPN session is fully established.

In an example embodiment, the device may be configured to pause and continue a previously established VPN session without requiring user interaction or reauthentication based on network location (e.g., trusted/untrusted). When in a paused state (trusted network detected), the VPN connection and filter enforcement are put into a bypass mode, allowing normal network access. Once an 'untrusted' network is detected, the previously established VPN session is continued, complete with filtering policies being re-established (for example if a user disconnects from the VPN after the VPN session is continued, then network restrictions are applied based on specified policy.

FIG. 1 illustrates an example 100 of where a device 102 may connect to a trusted network 104 or an untrusted network 106 in accordance with an example embodiment. In the illustrated example, untrusted network 106 is coupled with trusted network 104 via one or more switches and/or routers 108. Device 102 may be connected to a trusted network 104 as illustrated by 110A or may be connected with untrusted network 106 as illustrated by 110B.

In an example embodiment, device 102 determines whether it is connected directly to trusted network 104 as illustrated by 110A or untrusted network 106 as illustrated by 110B. Device 102 restricts access, data ingress and/or data egress, responsive to determining that device 102 is not connected to trusted network 104 but is connected to untrusted network 106. Device 102 does not restrict network access while the interface is directly connected with network 104, (e.g., a predefined network).

Device 102 while connected to network 106 may prohibit all access or may allow limited access. For example, device 102 may limit access to predefined protocols such as HTTP, HTTPS, and/or DNS. In particular embodiments, device 102 may limit access for a predefined time period. In another example embodiment, device 102 may limit the number of requests or re-directs that will be coupled to untrusted network 106. In an example embodiment, device 102 may block the sending of data onto network 106, for example remote procedure calls (such as Microsoft's Remote Procedure Call or "MSRPC") may be blocked.

In an example embodiment, device 102 attempts to establish a secure connection with a device that provides access to the predefined network while the interface is connected to a network other than the predefined network. For example, referring to FIG. 2 with continued reference to FIG. 1, there is illustrated a network 200 where device 102 attempts to establish a VPN tunnel 202 with a VPN endpoint while connected to untrusted network 106. Device 102 may be configured that until a VPN connection is established, e.g., VPN endpoint 204 is authenticated, device 102 will only allow communications that will enable device 102 to connect with VPN endpoint 204. Once the VPN connection is established, all traffic from device 102 is routed through VPN tunnel 202 to/from VPN endpoint 204.

Device 102 may employ any suitable technique to determine whether it is coupled with trusted network 104 or untrusted network 106. For example, device 102 may obtain a domain name server list and/or determine what servers are associated with the network where device 102 is connected.

In an example embodiment, device 102 may setup a secure communication session, for example a VPN connection via VPN tunnel 202 to VPN endpoint 204 while on un-trusted network 106, and suspend the connection upon connecting to trusted network 104. If device 102 once again connects to an untrusted network, e.g., untrusted network 106, device 102 may resume the secure session.

Although the examples illustrated herein comprise one untrusted network and one trusted network those skilled in the art should readily appreciate that the number of networks in the illustrated examples were selected merely for ease of illustration and that there may be any physically realizable number of trusted and untrusted networks. Therefore, the preceding examples should not be construed as being limited to the number of networks appearing in the illustrated examples.

Figure 3:
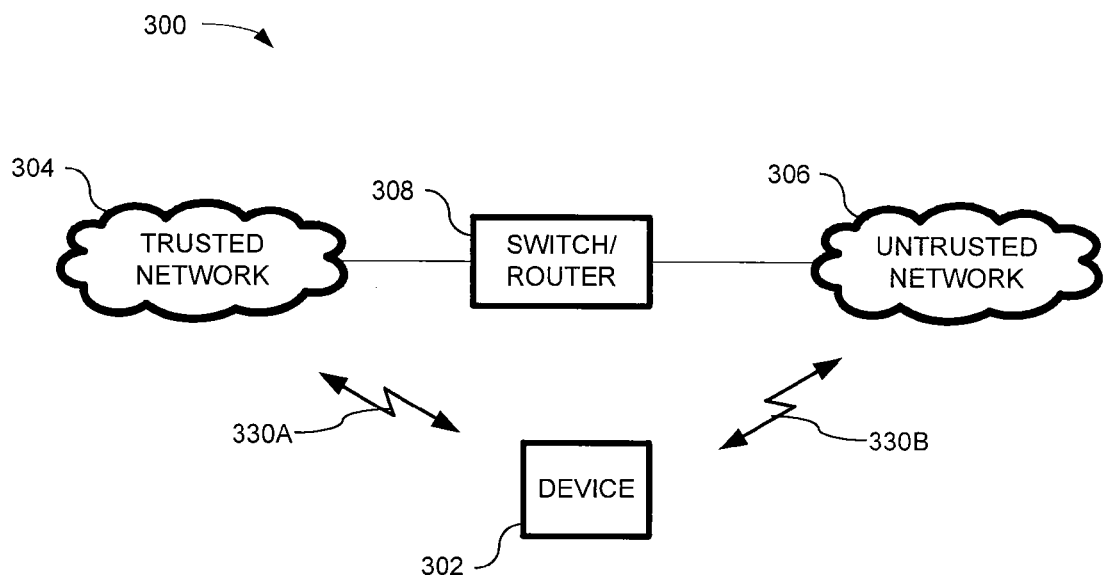
FIG. 3 illustrates an example of a device with multiple interfaces where one interface is coupled with a trusted network while a second interface is coupled with an untrusted network.

FIG. 3 illustrates an example 300 of a device 302 with multiple interfaces where one interface is coupled with a trusted network 304, as illustrated by 330A, while a second interface is coupled with an untrusted network 306, as illustrated by 330B. The networks may be coupled together via at least one switch/router 308. For example, a cell phone may have a Wi-Fi connection to a trusted network, and a 3G ($3^{rd}$ Generation) connection to an untrusted network. A policy can be employed to decide whether to establish a VPN tunnel on the 3G network, or just to block access on the 3G network. If the Wi-Fi interface loses connectivity to the trusted network, then processing can continue on the untrusted interface. If a tunnel had been previously established on the 3G interface, then failover is pretty seamless. However, if no tunnel was previously established on the 3G interface, then a tunnel is established, which can result in a delay.

Figure 4:
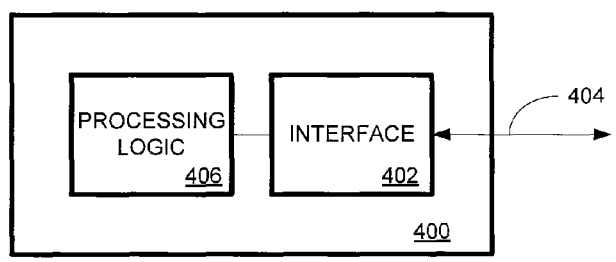
FIG. 4 illustrates an example of a device configured in accordance with an example embodiment.

FIG. 4 illustrates an example of a device 400 configured in accordance with an example embodiment. Device 400 is suitable for implementing the functionality of device 102 described in FIGS. 1-3. Device 400 comprises an interface 402 configured to communicate with at least one external device via communication link 404, and processing logic 406 coupled with interface 402. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Figure 2:
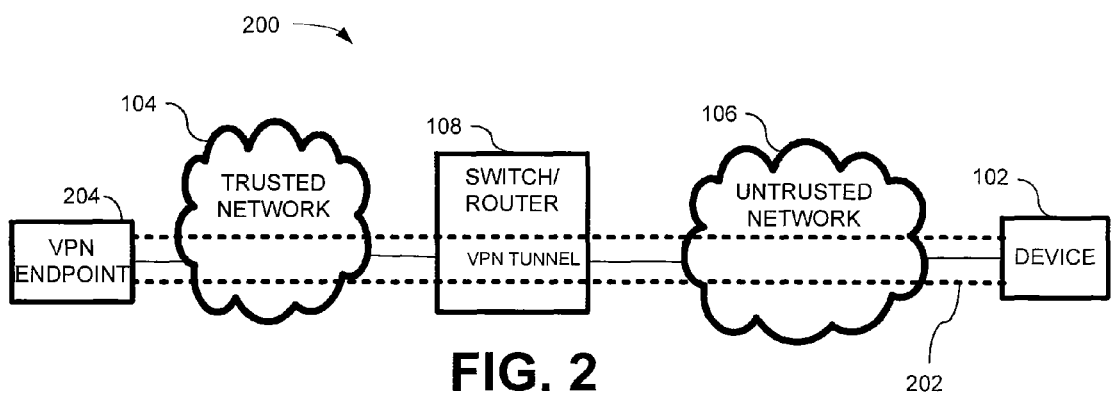
FIG. 2 illustrates an example where a device employs a virtual private network (VPN) to communicate with the trusted network while connected to the untrusted network.

In an example embodiment, processing logic 406 determines whether interface 402 is connected directly to a predefined network (for example trusted network 104 in FIGS. 1 and 2). Processing logic 406 restricts access to interface 402 responsive to determining the interface is connected to a network other than the predefined network; however, processing logic 406 does not restrict access to interface 402 while interface 402 is directly connected with the predefined network.

Figure 5:
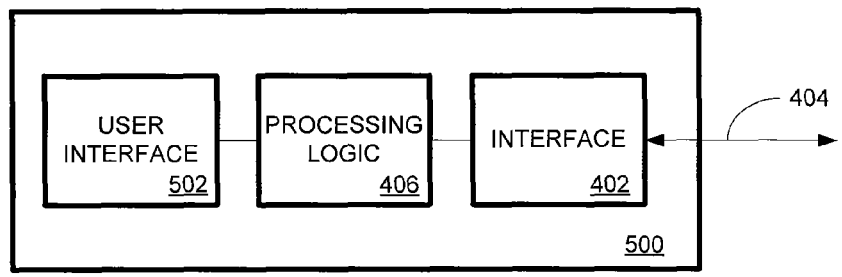
FIG. 5 illustrates an example of a device with a user interface configured in accordance with an example embodiment.

In an example embodiment, processing logic 406 restricts access to interface 402 by blocking access to interface 402. In another example embodiment, processing logic processing logic 406 restricts access to interface 402 by allowing limited access to interface 402. For example, processing logic 406 may restrict access to interface 402 to certain predefined protocols, such as HTTP, HTTPS, DNS and/or DHCP. Optionally, processing logic 406 may permit the predefined protocols for a limited time period. For example, if at a site that requires a user to accept terms or conditions, processing logic 406 may permit limited access to allow data to displayed on a user interface (for example FIG. 5 illustrates an example of a device 500 which further comprises a user interface 502 that may allow data to be input and/or output with an associated user), and allow a user to respond to the data. User interface 502 may suitably comprise a video and/or audio output, keyboard and/or mouse input or a touchscreen). In an example embodiment processing logic 406 may enable an associated user to log in (authenticate) with a VPN endpoint.

In an example embodiment, processing logic 406 attempts to establish a secure connection with a device on the predefined network while interface 402 is connected to a network other than the predefined network. For example, referring to FIG. 2 while connected untrusted network 106, device 102 may attempt to connect to VPN endpoint 204 on trusted network 104 to establish VPN tunnel 202 from device 102 through untrusted network 106 to trusted network 104. In an example embodiment, once a VPN connection is established, Processing logic 406 may restrict access to interface 402 to communications with the virtual private network once communications with the virtual private network is established while connected to a network other than the predefined network.

In an example embodiment, processing logic 406 blocks remote procedure calls (e.g., MSRPC) from passing through interface 402 while interface 402 is connected to a network other than the predefined network. Once a secure connection is established with the trusted network (e.g., a VPN connection), processing logic 406 may allow remote procedure calls to be routed to the trusted network via the secure (e.g., VPN) connection.

In an example embodiment, processing logic 406 determines whether interface 402 is coupled with the predefined network by sending a secure hypertext transfer protocol (HTTPS) probe via interface 402 onto communication link 404. The probe may be sent to a predefined endpoint, such as a server on the trusted network. Processing logic 406 may cryptographically authenticate the endpoint and have any filtering devices on the path to the endpoint cryptographically prove that they are in the path.

In an example embodiment, processing logic 406 determines whether the interface is coupled with the predefined network by obtaining a domain name server (DNS) list associated with interface 402. In another example embodiment, processing logic 406 determines whether interface 402 is coupled with the predefined network by determining what servers are connected to interface 402.

In an example embodiment, processing logic 406 establishes a secure connection with a device on the predefined network while the interface is connected to a network other than the predefined network. For example processing logic 406 may establish a VPN connection with a VPN endpoint. Once the VPN connection is established, processing logic routes all data traffic to the VPN endpoint. Processing logic 406 may suspend the secure connection responsive to determining that interface 402 has connected with the predefined network (e.g., the 'trusted network' 104 in FIGS. 1 and 2). Processing logic 406 resumes the secure connection responsive to determining interface 402 is no longer connected with the predefined network (e.g., interface 402 is once again connected to the "untrusted network" 106 in FIGS. 1 and 2).

Figure 6:
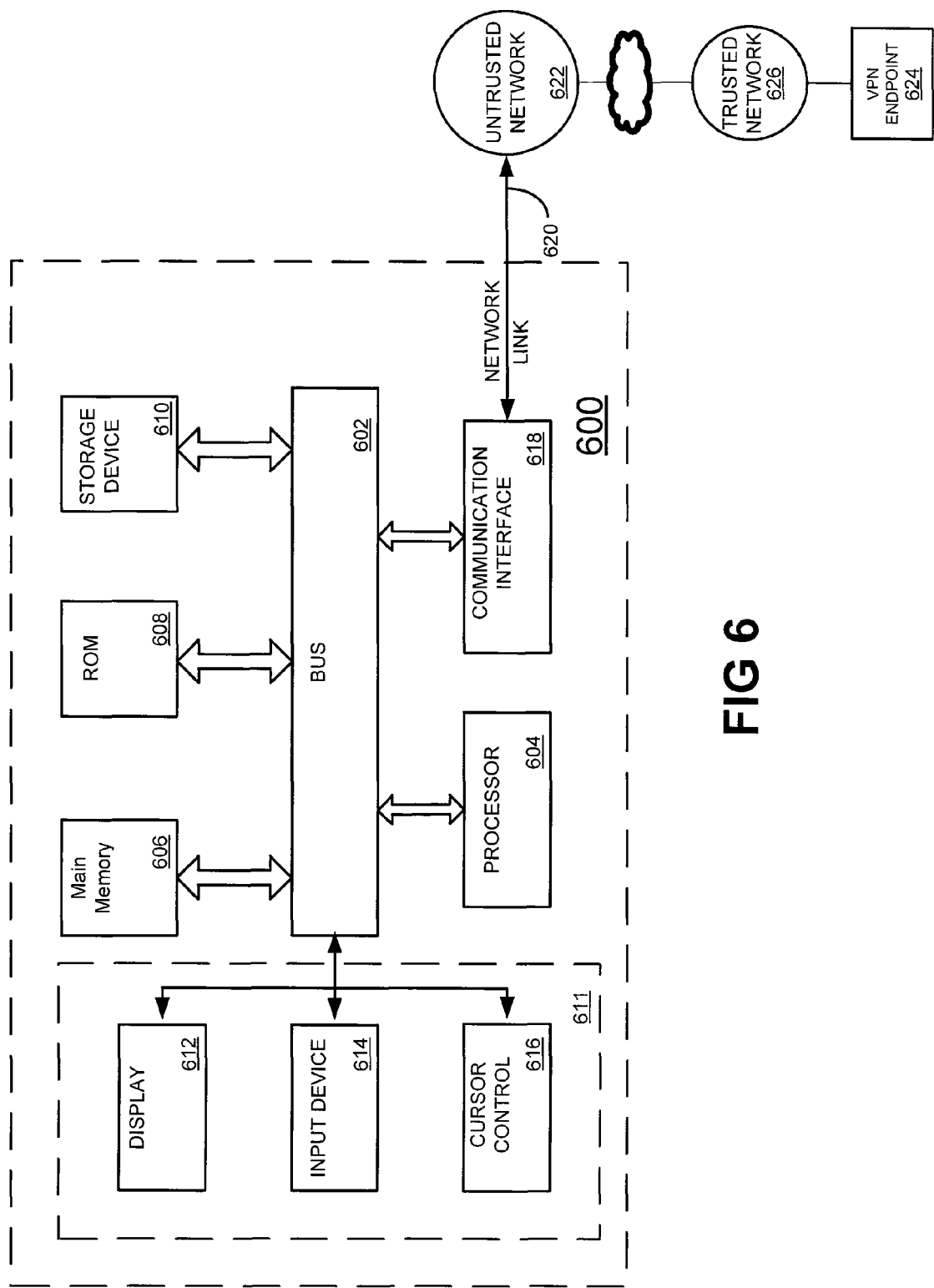
FIG. 6 illustrates a computer system upon which an example embodiment can be implemented.

FIG. 6 illustrates a computer system 600 upon which an example embodiment can be implemented. Computer system 600 is suitable for implementing the functionality of devices 102 (FIGS. 1 and 2), device 402 (FIG. 3), and/or processing logic 402 (FIGS. 4 and 5).

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

In an example embodiment, computer system 600 may further comprise a user interface 611 coupled via bus 602. User interface 611 may suitably comprise a display 612 such as a cathode ray tube (CRT) or liquid crystal display (LCD), for displaying information to a computer user. An input device 614, such as a keyboard including alphanumeric and other keys is coupled to bus 602 for communicating information and command selections to processor 604. Another type of user input device is cursor control 616, such as a mouse, a trackball, cursor direction keys, and/or a touchscreen for communicating direction information and command selections to processor 604 and for controlling cursor movement on display 612. This input device typically has two degrees of freedom in two axes, a first axis (e.g. x) and a second axis (e.g. y) that allows the device to specify positions in a plane.

An aspect of the example embodiment is related to the use of computer system 600 for restricting network access while using an untrusted network. According to an example embodiment, restricting network access while using an untrusted network is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any non-transitory medium that participates in providing instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 600 also includes a communication interface 618 coupled to bus 602. Communication interface 618 provides a two-way data communication coupling computer system 600 to a network link 620 that is connected to a local network 622. For example, communication interface 618 may be a local area network (LAN) card to provide a data communication connection to a compatible LAN. As another example, communication interface 618 may be an integrated services digital network (ISDN) card or a modem to provide a data communication connection to a corresponding type of telephone line. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 (an untrusted network) to a VPN endpoint 624 disposed on (trusted) network 626 that is coupled with network 622.

Figure 8:
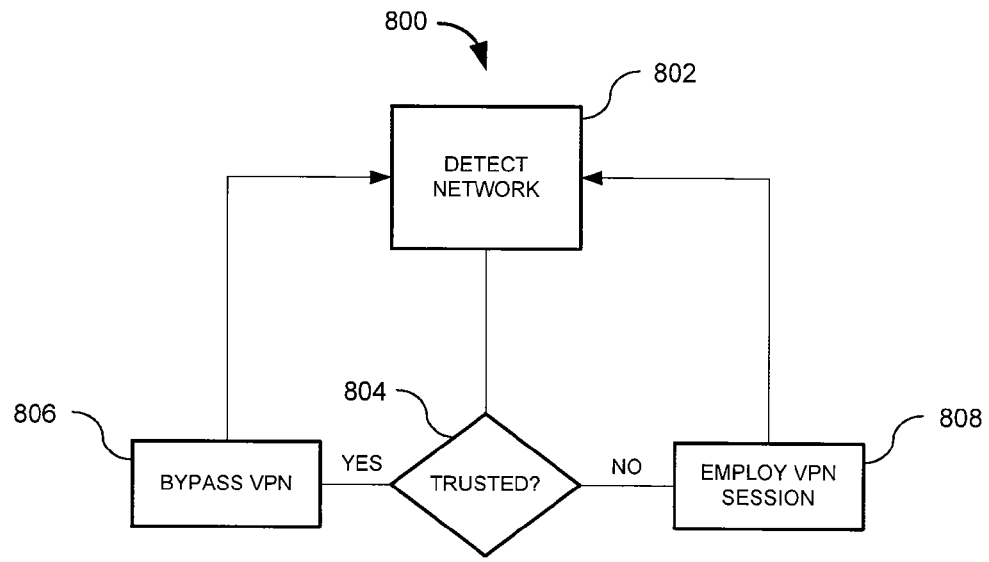
FIG. 8 illustrates an example methodology where a device determines whether to employ VPN.
Figure 7:
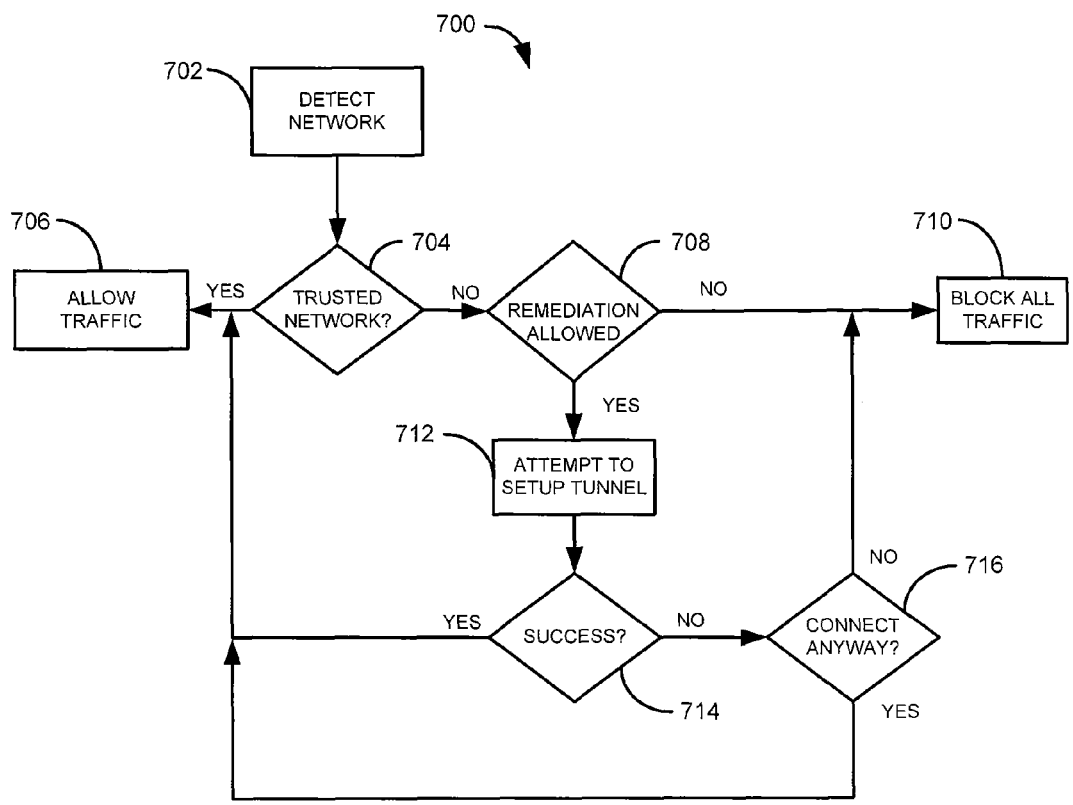
FIG. 7 illustrates an example methodology where a device restricts data traffic while on an untrusted network.

In view of the foregoing structural and functional features described above, methodologies in accordance with example embodiments will be better appreciated with reference to FIGS. 7 and 8. While, for purposes of simplicity of explanation, the methodologies of FIGS. 7 and 8 are shown and described as executing serially, it is to be understood and appreciated that the example embodiments described herein are not limited by the illustrated orders, as some aspects could occur in different orders and/or concurrently with other aspects from that shown and described herein. Moreover, not all of the illustrated features may be required to implement the methodologies described herein The methodology described herein is suitably adapted to be implemented in hardware, software, or a combination thereof.

FIG. 7 illustrates an example methodology 700 where a device restricts data traffic while on an untrusted network. Methodology 700 may be implemented by device 102 (FIGS. 1 and 2), device 402 (FIG. 3) processing logic 406 (FIGS. 4 and 5), and/or processor 604 (FIG. 6).

At 702, the network the device is communicating with is detected. Any suitable technique may be employed to determine whether the network is a predefined or trusted network, or whether the network is an un-trusted network. For example a HTTPS probe may be sent. As another example, a DNS server list may be obtained. Still yet another example, DHCP parameters can be checked to determine whether the device is coupled with a predefined network. Yet still yet another example, the adapter coupled with the network may be queried to determine what servers are communicating with the adapter.

At 704, a determination is made whether the network is a trusted or predefined network. The determination may be made based on the network detected at 702. For example, if a DNS server list is obtained, the determination can be made based on whether known DNS servers were detected. As another example, a HTTPS probe may be sent to a known endpoint, and cryptographically validating the response from the endpoint and/or cryptographically validating any filtering devices on the path to the known endpoint. As yet another example, DHCP parameters (e.g., DNS servers, default DNS search, etc.) can be obtained to determine whether the device is operating on a trusted network. If the device is operating on a trusted or predefined network (YES), at 706 access to the network is allowed.

If however, at 704, a determination is made that the device is connected to an un-trusted, which may be any network other than the predefined network, (NO), at 708 a determination is made whether remediation is allowed. In an example embodiment, no remediation is allowed (NO), and all traffic is blocked as illustrated at 710.

In another example embodiment, some form of remediation is allowed. For example, the device may attempt to contact an endpoint (such as a VPN endpoint) and setup a secure tunnel with the endpoint. In other example embodiments, certain predefined protocols (such as HTTPS, HTTP and/or DNS) may be allowed in order to facilitate setting up a secure connection with the predefined network. Limits may be placed on the protocols, for example only a certain number of login attempts may be permitted or the protocols may only be allowed for a predefined time period. Filter may be applied to the protocols to ensure that harmful activity is blocked (for example javascript content may be stripped).

If remediation is allowed (YES), at 712 the device attempts to setup a tunnel (for example a VPN tunnel) with an endpoint (such as a VPN device on the trusted network). As mentioned herein infra, certain protocols may be employed to allow a user associated with the device to navigate through a captive portal mechanism (such as accepting a custom web form from a service provider granting internet access). As another example, the device may be limited to sending probes (and receiving responses to the probes) to a server with a known name and cryptographically verifying the connection with the server.

At 714, a determination is made whether the tunnel was successfully setup. If the tunnel was successfully setup (YES), then traffic is allowed as illustrated by 706. In an example embodiment the traffic can be restricted by only allowing traffic to be sent and/or received through the tunnel. If at 714 a determination is made that a tunnel was not successfully setup (NO), then a determination is made at 716 whether to allow traffic anyway. For example, the policy may allow traffic depending on the reason for non-success (e.g., VPN server unavailable). If traffic is allowed (YES), at traffic is allowed as illustrated at 706. If the policy does not allow traffic in the event of a failure to establish the tunnel (NO), all traffic can be blocked as illustrated at 710.

FIG. 8 illustrates an example methodology 800 where a device determines whether to employ VPN. Methodology 800 may be implemented by device 102 (FIGS. 1 and 2), device 402 (FIG. 3), processing logic 406 (FIGS. 4 and 5), and/or processor 604 (FIG. 6).

At 802, an attempt is made to detect what network is currently providing communication services. As described herein supra, any suitable technique can be employed for detecting the network. For example, a HTTPS probe can be sent to a predefined endpoint, such as a server on the trusted network. The endpoint may be cryptographically authenticated and any filtering devices on the path to the endpoint may cryptographically prove that they are in the path. As another example, the network may be detected by obtaining a domain name server (DNS) list.

At 804, a determination is made whether the detected network is a trusted (e.g., predefined) network. If the network is a trusted network (YES), traffic may be sent and/or received outside of any established secure/VPN tunnels (e.g., the VPN tunnel is bypassed) as illustrated at 806. If, however, at 804, a determination is made that the network is not a trusted network (NO), then a secure (e.g., VPN) tunnel is employed for sending and/or receiving traffic as illustrated at 808.

In an example embodiment, a secure (e.g., VPN) tunnel may be established. The tunnel may be bypassed (e.g., suspended) while the device is connected with a trusted network. However, if the device roams to an untrusted network, the secure tunnel may be re-established. Note that 802, 804, 806, 808 may be repeated, for example anytime the device roams or a change in the connection is detected.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a network interface configured to communicate with an associated at least one external device;
   a user interface operatively coupled with the network interface; and
   processing logic operatively coupled with the network interface and the user interface;
   wherein the processing logic determines whether the network interface is connected directly with a predefined network;
   wherein the processing logic restricts access to the network interface to allow only communication through a secure tunnel responsive to determining the network interface is connected with a network other than the predefined network;
   wherein the processing logic suspends the secure tunnel permitting communication bypassing the secure tunnel while the network interface is directly connected with the predefined network;
   wherein the processing logic re-establishes the secure tunnel to restrict access to the network interface to allow only communication through the secure tunnel responsive to determining the network interface is connecting to the network other than the predefined network;
   wherein the network interface is configured to receive, from an associated captive portal, data representative of a captive portal access parameter;
   wherein the processing logic is configured to present the data representative of the captive portal access parameter on the user interface;
   wherein the processing logic is configured to selectively receive user confirmation data representative of a confirmation by an associated user of the apparatus of an acceptance by the associated user of the captive portal access parameter for capturing the associated captive portal;
   wherein the processing logic is configured to transmit, to the associated captive portal, the user confirmation data to effect the portal capture;
   wherein, responsive to transmitting the user confirmation data and effecting the portal capture, the processing logic opens a remediation window having one or more predefined remediation window limits, and sends a probe while the network interface is connected with the network other than the predefined network to attempt to establish a secure connection with an associated device that provides access to the predefined network;
   wherein the processing logic determines whether the network other than the predefined network is an untrusted network in accordance with a response received to the probe;
   wherein, responsive to determining the network other than the predefined network is an untrusted network and while the network interface is connected with the network other than the predefined network, the processing logic allows while the remediation window is open limited access to the interface to only communication establishing the secure connection with the associated device that provides access to the predefined network;
   wherein during the remediation window, the processing logic restricts access to the network interface to the device that provides access to the predefined network; and
   wherein, responsive to an expiration of the one or more predefined remediation window limits and without establishing via the associated captive portal the secure connection with the predefined network, the processing logic closes the remediation window to block network access.

2. The apparatus of claim 1, wherein the processing logic restricts access by blocking access to the network interface.

3. The apparatus of claim 1, wherein the processing logic restricts access by allowing limited access to the network interface.

4. The apparatus of claim 3, wherein the processing logic restricts access to the network interface to predefined protocols.

5. The apparatus of claim 4, wherein the processing logic permits the predefined protocols for a limited time period.

6. The apparatus of claim 1 wherein, responsive to receiving the unexpected response to the probe and while the network interface is connected to the network other than the predefined network, the processing logic allows during the remediation window limited filtered access to the network interface to establish the secure connection with the device that provides access to the predefined network.

7. The apparatus of claim 6, wherein the secure connection is a virtual private network connection and the device is a virtual private network endpoint.

8. The apparatus of claim 7, wherein the processing logic restricts access to the network interface to communications with the virtual private network once communications via the virtual private network is established while connected to a network other than the predefined network.

9. The apparatus of claim 1, wherein the processing logic blocks remote procedure calls from passing through the network interface while the network interface is connected to a network other than the predefined network.

10. The apparatus of claim 1, wherein the processing logic determines whether the network interface is coupled with the predefined network by sending a secure hypertext transfer protocol probe via the network interface.

11. The apparatus of claim 1, wherein the processing logic determines whether the network interface is coupled with the predefined network by obtaining a domain name server list associated with the network interface.

12. The apparatus of claim 1, wherein the processing logic determines whether the network interface is coupled with the predefined network by determining what servers are connected to the network interface.

13. The apparatus of claim 1, wherein the processing logic cryptographically verifies the network interface is coupled with the predefined network.

14. The apparatus of claim 1, wherein, responsive to transmitting the user confirmation data and effecting the portal capture, the processing logic opens the remediation window having one or more predefined remediation window limits comprising: limiting access to one or more predefined protocols; limiting access for one or more predefined time periods; limiting one or more of a number of requests and a number of re-directs to be coupled with the network other than the predefined network; and limiting one or more remote procedure calls.

15. A method, comprising:
    determining whether an interface is connected with a predefined network;
    selectively restricting access to the interface to allow only communication through a secure tunnel by a processor while the interface is connected with a network other than the predefined network;
    suspending the secure tunnel by the processor permitting communication bypassing the secure tunnel while the interface is connected with the predefined network;
    re-establishing the secure tunnel by the processor to restrict access to the interface to allow only communication through the secure tunnel responsive to determining the interface is connecting to the network other than the predefined network;
    receiving by the interface from an associated captive portal data representative of a captive portal access parameter;
    presenting by the processor the data representative of the captive portal access parameter on a user interface;
    receiving by the processing logic user confirmation data representative of a confirmation by an associated user of an acceptance by the associated user of the captive portal access parameter for capturing the associated captive portal;
    transmitting by the processing logic to the associated captive portal the user confirmation data to effect the portal capture;
    responsive to the transmitting the user confirmation data and effecting the portal capture, opening a remediation window having one or more predefined remediation window limits, and
    sending a probe while the interface is connected with the network other than the predefined network to attempt to establish a secure connection with an associated device that provides access to the predefined network;
    determining whether the network other than the predefined network IS an untrusted network in accordance with a response received to the probe;
    responsive to determining the network other than the predefined network is an untrusted network and while the interface is connected with the network other than the predefined network,
    allowing while the remediation window is open limited access to the interface to only communication establishing the secure connection with the associated device that provides access to the predefined network;
    during the remediation window, restricting access to the interface to the associated device;
    responsive to an expiration of the one or more predefined remediation window limits and without establishing via the associated captive portal the secure connection with the predefined network, closing the remediation window to block network access.

16. The method according to claim 15, the selectively restricting comprises allowing access to the interface to establish a secure connection with the predefined network while connected with a network other than the predefined network.

17. The method according to claim 15, the selectively restricting comprises establishing a secure connection and limiting access to the interface to the secure connection upon establishing the secure connection.

18. The method according to claim 17, wherein the secure connection is a virtual private network connection.

19. The method according to claim 15, wherein determining whether the interface is connected to a predefined network comprises probing for a server with a known name and cryptographically verifying the connection with the server.

20. The method according to claim 15, determining whether the interface is connected to a predefined network comprises obtaining dynamic host configuration protocol parameters via the interface; and
    determining whether the dynamic host configuration protocol parameters are appropriate for the predefined network.

21. Logic encoded on at least one non-transitory tangible media for execution by a processor, and when executed operable to:
    determine whether an interface is connected with a predefined network;
    selectively restrict access to the interface to allow only communication through a secure tunnel by a processor while the interface is connected with a network other than the predefined network;
    suspend the secure tunnel by the processor to permit communication bypassing the secure tunnel while the interface is connected with the predefined network;
    re-establish the secure tunnel to restrict access to the interface to allow only communication through the secure tunnel responsive to determining the interface is connecting to the network other than the predefined network;
    receive from the associated captive portal data representative of a captive portal access parameter;
    present the data representative of the captive portal access parameter on a user interface;
    receive user confirmation data representative of a confirmation by an associated user of an acceptance by the associated user of the captive portal access parameter for capturing the associated captive portal;
    selectively transmit the user confirmation data to the associated captive portal to effect the portal capture;
    responsive to transmitting the user confirmation data and effecting the portal capture, open a remediation window having one or more predefined remediation window limits, and send a probe while the interface is connected to the network other than the predefined network to attempt to establish a secure connection with an associated device that provides access to the predefined network;

determine whether the network other than the predefined network is an untrusted network in accordance with a response received to the probe;

responsive to determining the network other than the predefined network is an untrusted network and while the interface is connected with the network other than the predefined network, allow while the remediation window is open limited access to the interface to only communication establishing the secure connection with the associated device that provides access to the predefined network;

during the remediation window, restrict access to the interface to the device that provides access to the predefined network; and close the remediation window to block network access responsive to an expiration of the one or more predefined remediation window limits and without establishing via the associated captive portal the secure connection with the predefined network.

* * * * *